US011358850B2

(12) United States Patent
Ohrem et al.

(10) Patent No.: US 11,358,850 B2
(45) Date of Patent: Jun. 14, 2022

(54) MAGNETORHEOLOGICAL ACTUATOR FOR A FILLING UNIT OF A BEVERAGE FILLING SYSTEM

(71) Applicant: KHS GmbH, Dortmund (DE)

(72) Inventors: Jochen Ohrem, Bad Kreuznach (DE); Jonathan Lorenz, Bad Kreuznach (DE); Bernd Bruch, Weinsheim (DE); Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 4 days.

(21) Appl. No.: 16/625,862

(22) PCT Filed: Jun. 28, 2018

(86) PCT No.: PCT/EP2018/067346
§ 371 (c)(1),
(2) Date: Dec. 23, 2019

(87) PCT Pub. No.: WO2019/002428
PCT Pub. Date: Jan. 3, 2019

(65) Prior Publication Data
US 2020/0148524 A1 May 14, 2020

(30) Foreign Application Priority Data
Jun. 30, 2017 (DE) .............. 10 2017 114 712.8

(51) Int. Cl.
*B67C 3/28* (2006.01)
*B67C 3/26* (2006.01)
*F16K 31/06* (2006.01)

(52) U.S. Cl.
CPC .............. *B67C 3/28* (2013.01); *B67C 3/26* (2013.01); *F16K 31/0672* (2013.01)

(58) Field of Classification Search
CPC ......... B67C 3/28; B67C 3/26; F16K 31/0641; F16K 31/0672; F16K 31/106;
(Continued)

(56) References Cited

U.S. PATENT DOCUMENTS 4,690,371 A * 9/1987 Bosley ................ H01F 7/18
251/129.08
4,757,847 A * 7/1988 Jorss ................ B67C 3/2622
141/198

(Continued)

FOREIGN PATENT DOCUMENTS

| CN | 1471617 A | 1/2004 |
| CN | 102437709 A | 5/2012 |

(Continued)

OTHER PUBLICATIONS

WO-2010054775-A1_English_Translation_of_Specification.pdf (Year: 2021).*

(Continued)

*Primary Examiner* — Timothy P. Kelly
*Assistant Examiner* — Stephanie A Shrieves
(74) *Attorney, Agent, or Firm* — Occhiuti & Rohlicek LLP (57) ABSTRACT

An actuator for controlling a fluid path includes an actuator having a seat part, either a fluid-valve membrane or a movable part, and a magnetorheological elastomer that changes form when a magnetic field changes. This causes the path to open or close.

8 Claims, 12 Drawing Sheets

(58) Field of Classification Search
CPC ...... F16K 31/126–1266; F16K 31/0655–0665; F16K 7/045; F16F 1/361
USPC .............................. 141/392; 251/4, 7, 251.06
See application file for complete search history.

(56) References Cited

U.S. PATENT DOCUMENTS

| | | | | |
|---|---|---|---|---|
| 5,265,843 | A * | 11/1993 | Kleinhappl | F16K 31/0658 251/129.17 |
| 7,648,118 | B2 * | 1/2010 | Ukpai | F16H 57/0447 251/11 |
| 2003/0120157 | A1 * | 6/2003 | Fukui | F16K 31/0679 600/484 |
| 2004/0266319 | A1 * | 12/2004 | Kordonski | F16K 13/10 451/5 |
| 2005/0006611 | A1 * | 1/2005 | Choi | F16K 31/0655 251/65 |
| 2007/0241298 | A1 * | 10/2007 | Herbert | F16K 7/16 251/129.04 |
| 2008/0029725 | A1 * | 2/2008 | Ito | F16K 7/14 251/129.17 |
| 2011/0042598 | A1 * | 2/2011 | Kozak | F16K 31/0672 251/129.17 |
| 2012/0060965 | A1 * | 3/2012 | Poeschl | B67C 3/02 141/1 |
| 2013/0221255 | A1 | 8/2013 | Ferguson | |
| 2015/0152972 | A1 * | 6/2015 | D'Errico | F16K 1/36 141/311 R |
| 2015/0184770 | A1 * | 7/2015 | Ferguson | F16K 31/0651 137/528 |
| 2018/0180195 | A1 * | 6/2018 | Levien | F16K 1/36 |

FOREIGN PATENT DOCUMENTS

| | | | |
|---|---|---|---|
| CN | 103899810 A | 7/2014 | |
| DE | 19529152 A1 | 2/1997 | |
| DE | 29913326 | 11/1999 | |
| DE | 20319619 | 3/2004 | |
| DE | 112005000562 | 6/2009 | |
| DE | 102010032398 | 2/2012 | |
| DE | 102012105347 | 12/2013 | |
| DE | 102013214952 | 2/2015 | |
| DE | 102016103661 | 9/2017 | |
| EP | 1072832 | 1/2001 | |
| WO | WO2010/054775 | 5/2010 | |
| WO | WO-2010054775 A1 * | 5/2010 | ............ F16K 31/02 |
| WO | WO 2017/148614 | 9/2017 | |

OTHER PUBLICATIONS

Yancheng Li et al., "A state-of-the-art review of magnetorheological elastomer devices," *Smart Materials and Structures*, vol. 23, No. 12, p. 123004 (Nov. 11, 2014).

* cited by examiner

MAGNETORHEOLOGICAL ACTUATOR FOR A FILLING UNIT OF A BEVERAGE FILLING SYSTEM

RELATED APPLICATIONS

This is the national stage of international application PCT/EP2018/067346, filed on Jun. 28, 2018, which claims the benefit of the Jun. 30, 2017 priority date of German application DE 102017114712.8, the contents of which are herein incorporated by reference.

FIELD OF INVENTION

The present invention relates to an actuator for controlling the fluid paths of a filling unit for a beverage filling system, a filling unit for a beverage filling system, and a beverage filling system.

BACKGROUND

Beverage filling systems are used for the industrial filling of beverages. Such filling systems use valves to control flow of beverage into containers and to prepare the containers for filling by evacuating oxygen and flushing the containers with inert gas.

Electro-pneumatic actuators are often used to control these valves. However, such actuators are expensive.

SUMMARY

An object of the invention is to provide a simple and inexpensive actuator with a long service life for controlling the fluid paths of a filling unit for a beverage filling system.

In one aspect, the invention features an actuator for controlling a fluid path of a filling unit for a beverage filling system to be provided with a control unit and with an actuator element, by means of which an adjusting force can be provided, wherein, by means of the control unit, at least one first control signal and at least one second control signal can be provided, and wherein the actuator element consists of a material which, as a dependency of a first control signal, undergoes a first expansion, in which the actuator element adopts a first position of rest, and which, as a dependency of the second control signal, undergoes an expansion, in which the actuator element adopts a second engagement position.

According to the invention, provision is also made for the material of the actuator element, or of a moving part, to be or to comprise a magnetorheological elastomer. It is provided that the magnetorheological elastomer can be activated by an externally imposable magnetic field by means of the electromagnet according to the invention, for example by means of a ring coil.

Magnetorheological elastomers (MRE) are, for example, composites of magnetizable particles, such as iron in an elastomer matrix such as silicone or natural rubber. When a magnetic field is imposed, the MRE body deforms or moves in the magnetic field, and carries out an actuator movement. Here too, when the magnetic field is switched off the material reverts to its initial shape or position. The movement can be carried out within a few milliseconds, provided that the magnetic field can be built up rapidly enough. In its first position the actuator element can actuate a fluid path of the filling unit with sealing effect, and in its second position the actuator element can actuate the fluid path such that there is no sealing effect. As a result, including the corresponding functional linking, a simple means of controlling the fluid path of the filling unit can be achieved. In this situation, a rapid to-and-fro movement of the closure part can be ensured due to the use of an MRE in a magnetic field.

The invention is based on the basic principle of providing an actuator for controlling at least one fluid path of a filling unit for a beverage filling system with an actuator element which, on the basis of its material properties can be activated in such a simple manner that, due to a change of shape of the actuator element, this element can be brought into at least two defined positions, in this situation a position of rest and a engagement position. In the position of rest, for example, it can be provided that the fluid path is open. It is then further provided that in the engagement position the fluid path is blocked. In this connection it is conceivable in particular that the adjusting force which is exerted by the actuator element in this connection, in this case, for example, in the engagement position, is sufficient to close the fluid path with sealing effect. It is basically also conceivable, however, that the position of rest is a position in which the fluid path is blocked and the engagement position is a position in which the fluid path is opened. In this case, this would be referred to as a "normally closed" actuator ("NORMALLY CLOSED" configuration). In the case represented previously, this could be referred to as a "normally open" actuator ("NORMALLY OPEN" configuration). The fluid path can in particular relate to a gas path of a filling unit. It is in principle also conceivable, however, that it relates to a fluid path for conveying the beverage that is to be filled.

The object is achieved according to the invention in that the actuator element is a fluid valve membrane or a moving part and the closure part is a component part of the fluid valve membrane or of the moving part, or an additional part, at which the closure part is formed, is driven by the fluid valve membrane or by the movable part respectively.

An advantageous further embodiment of the invention makes provision that the actuator element is a disk, with which, in particular, the edge is the fixed seat part. As a result, the valve paths in conventional valves can be closed or opened with good effect. The actuator element according to the invention is a fluid valve membrane.

An alternative advantageous further embodiment of the invention makes provision that the actuator element is a ring or a disk, of which the outer edge is the fixed seat and of which the inner edge is securely connected to a moving part, which is movable in the actuator, wherein the movable part is a fluid valve membrane.

A further advantageous embodiment of the invention makes provision that at the closure part of the actuator element a plastic part is located with its middle part, of which the outer part is connected securely to the actuator and the plastic part is a fluid valve membrane. As a result of this, it is not necessary for a spring or another additional part to be attached to the actuator element in order to bring it back into its first shape.

An alternative advantageous further embodiment of the invention provides that the actuator element is a ring, of which the cross-section is U-shaped, with the opening facing outwards, and of which the two outer edges form the fixed seat. As a result, the size of a ring gap can be altered in relation to a part which is located inside the ring opening, in the manner of a bead or collar, without the entire volume of such a bead or collar necessarily being filled with the MRE; rather, only a very small use of material is required, which saves costs.

An advantageous further embodiment of the invention provides for the adjusting force to amount to at least approximately 200-400 N, in particular approximately 350-

370 N, and for preference approximately 360 N. This order of magnitude of adjusting force has proved to be particularly advantageous in providing a secure closure of the fluid paths at the working pressures which prevail in the filling unit and in the beverage filling system.

A further advantageous embodiment of the invention provides for the material of the actuator element to comprise an electrorheological fluid or a gel. In this situation, by the imposition of a voltage, an expansion of the fluid or of the gel can be attained.

A further advantageous embodiment of the invention provides for the actuator element to be connected by one end to a spring—pressure spring or tension spring—and the other end being securely connected to the actuator. As a result, the "NORMALLY OPEN" and "NORMALLY CLOSED" configurations can be reached in a simple manner.

A further advantageous embodiment of the invention provides for the additional part to be a movable part, which comprises a head that can be moved into a flow channel, and, at different deep settings inside the flow channel, forms a ring gap of changeable size. In a manner comparable to the preceding solution with the U-shaped cross-section, as a result of this arrangement the size of the ring gap can be changed very easily as a dependency of the strength of the magnetic field. The difference in relation to the embodiment referred to lies in the fact that in the preceding case the change in the size takes place in the radial direction, while here it is in the axial direction to the ring.

A further advantageous embodiment of the invention provides for the actuator to comprise, in addition to the first actuator element, a further actuator element, which is of the same design as the first actuator and is arranged parallel to it. As a result of this, further potential applications are opened up, in particular with double valves, which allow for good opening and closing of both fluid paths, including independently of one another.

A further advantageous embodiment of the invention provides for the two actuator elements to be in contact with one another in their respective provisions of rest. Such an arrangement allows for a more compact structural configuration than if the two actuator elements are at a distance from one another.

A further advantageous embodiment of the invention provides for the actuator to comprise a double valve. This allows the invention to be used in further sectors.

A further advantageous embodiment of the invention provides for the actuator to comprise two electromagnets, wherein the first electromagnet is arranged above the actuator element and the second electromagnet is arranged below it. As a result, it is not necessary for a spring or another additional part to be arranged at the actuator element, which brings the actuator back into its first shape. In addition to this, with a configuration with two actuator elements in a double valve, controlling of the two actuators can be effected (almost) independently of one another.

In addition to this, provision can be made for the material of the actuator element to comprise one or more of the following materials, or for the actuator to comprise a corresponding element: A magnetorheological fluid or such a gel, a dielectric elastomer, a thermal memory alloy, a magnetic memory alloy, a piezoceramic, a piezoceramic stack, a piezo pressure sensor.

In addition to this, provision can be made for several actuator elements to be connected in series. In particular, in this situation the actuator elements can at least in part form a folding bellows structure. In principle, it is conceivable that several actuator elements of the same type are used, i.e. with a similar or identical choice of material. In principle, it is also possible, as an alternative or in addition, for several types of material for the actuator elements to be combined, in particular as referred to individually heretofore, in particular with regard to the attaining and adjusting of the corresponding adjusting forces, but also of lifting paths.

The lifting path of the actuator can lie in the range of a few millimeters, wherein a lifting path of greater than 1 millimeter, in particular in the range between 5 to 10 mm, has transpired to be advantageous. Also conceivable in principle, however, are lifting paths of greater than 10 mm, in particular when this relates to the controlling of fluid paths for fluids.

In its first shape, the actuator element can define a switching position, in which a fluid valve membrane, such as the actuator element is configured, is actuated with sealing effect into the at least one fluid path of the filling unit, and, in its second shape, the actuator element can define a switching position in which the fluid valve membrane is actuated without sealing effect. By the combination of actuator and fluid valve membrane, and the corresponding functional linking of the two, a simple controlling of the fluid path of the filling unit.

Further details and advantages of the invention are explained in greater detail on the basis of the exemplary embodiments represented in the drawings, in which:

DETAILED DESCRIPTION

Figure 1:
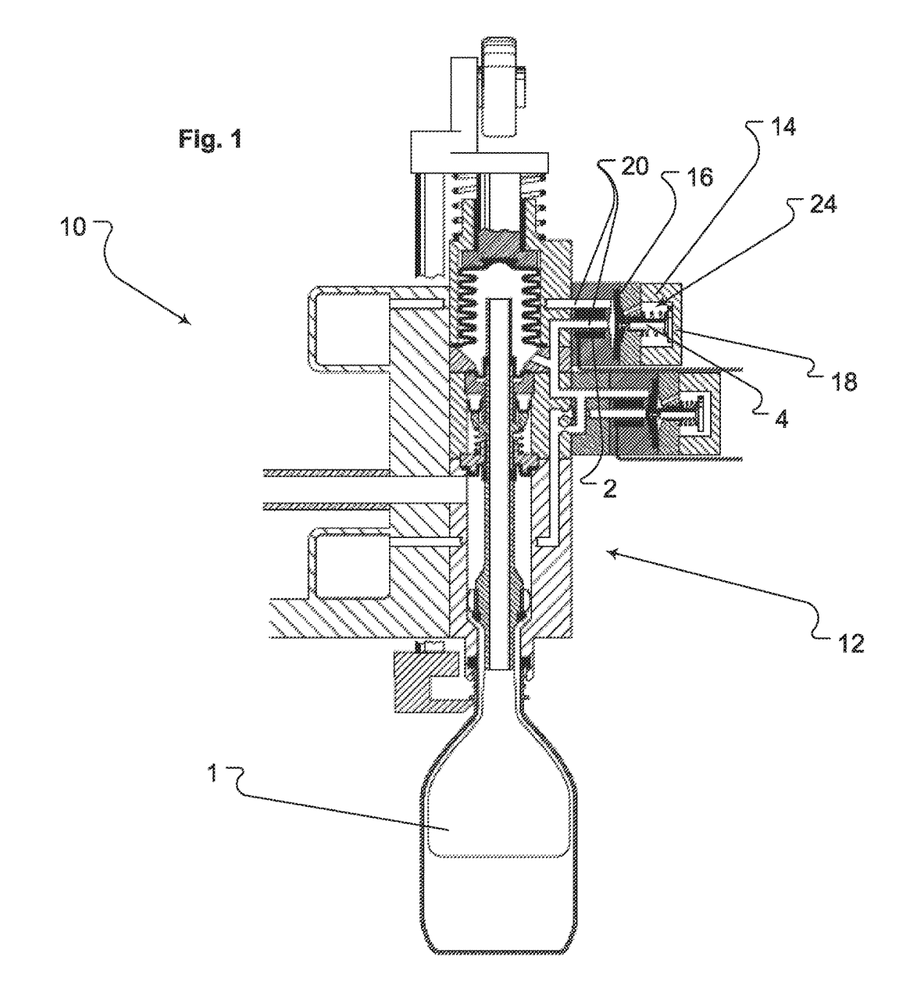
FIG. 1 is schematic sectional representation of a beverage filling system and an actuator.

FIG. 1 shows a filling unit 12 having a housing 18 that houses an actuator 14 and a fluid-path membrane 16 that cooperate to control a fluid path 20. A control unit, which is not shown, provides first and second control signals.

The actuator 14 includes an actuator element 24, at least part of which is made of a material that response to the first and second signals by assuming corresponding first and second forms. The first form corresponds to a rest position and the second form corresponds to an engagement position. A ring at the actuator's free end acts as a damper. The actuator 14 switches between forms within about forty milliseconds in either direction.

Such transitions result in an adjusting force. In some embodiments, the adjusting force is on the order of two hundred to four hundred newtons. In other embodiments, the adjusting force is between 350 newtons and 370 newtons. A particularly useful force would be 360 newtons.

The fluid-path membrane 16 has a lifting path that extends approximately six millimeters or more. In some examples, the path is more than ten millimeters long. In some embodiments, it is as much as twenty-four millimeters long.

Working pressures are between three and ten bar. In particular embodiments, the working pressure is ten bar. With adjustment of the membrane's surface, the working pressure is about six bar. In some embodiments, three switching cycles can be carried out in no more than 1.2 seconds.

In one switching position, the actuator 14 releases the fluid-path membrane 16. In another switching position, the actuator 14 actuates the fluid-path membrane 16, thus causing it to seal the fluid path 20.

The actuator 24 transitions between first and second switching positions. In the first switching position, the fluid-path membrane 16 seals the fluid path 20. This is the "closed position." In the second switching position, the fluid-path membrane 16 is not actuated. Hence, the fluid path 20 remains open. This is the "open position."

Embodiments in include those in which the default state of the fluid path 20 is open and those in which the default state of the fluid path 20 is closed. These are referred to herein as the "normally open" configuration and the "normally closed" configuration respectively.

FIGS. 2-12 show different embodiments of an actuator 14 with different actuator elements 24, 24'. Those parts that are the same across all the figures are that achieve the same function are marked with the same reference numerals. In all embodiments, the actuator element 24 comprises a magnetorheological elastomer.

Figure 2A:
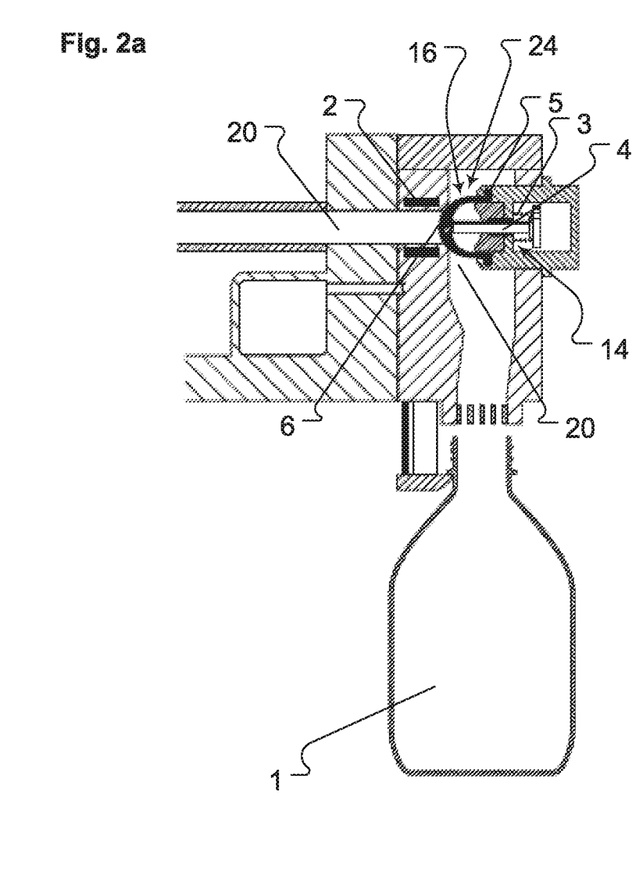
FIGS. 2a-b show a first embodiment of an actuator.
Figure 2B:
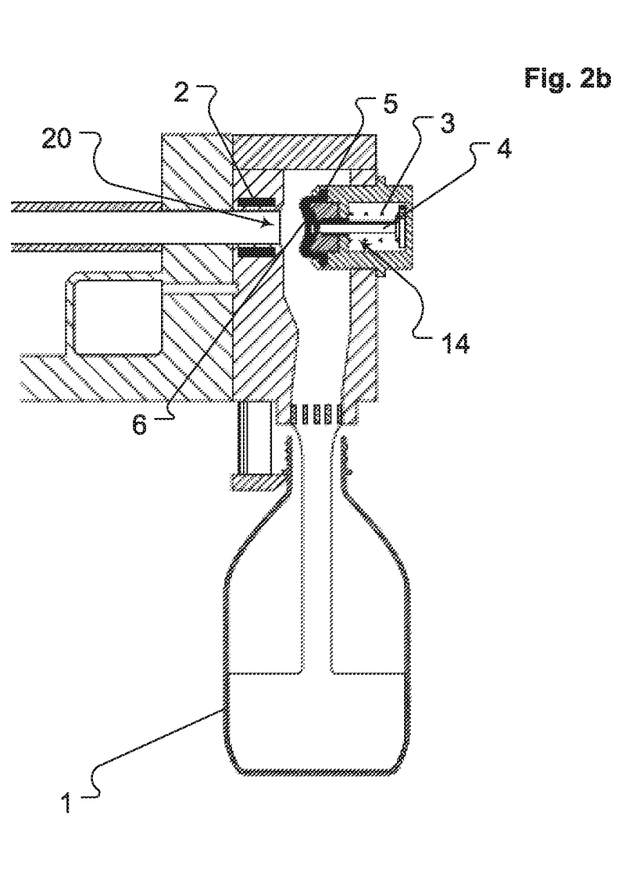

FIGS. 2a and 2b show a first embodiment of an actuator 14. In FIG. 2a, the actuator element 24 has its fluid-path membrane 16 arranged to close the fluid path 20. In FIG. 2b, the fluid-path membrane 16 is in a state that opens the fluid path 20.

The fluid-path membrane 16 is formed completely from a magnetorheological elastomer that forms a disk. The disk has an edge and an inner portion. The edge defines a seat 5 by which the fluid-path membrane 16 is securely anchored in the actuator 14. The inner part is a closure part that changes its form so as to transition between the two positions shown in the figures.

A ram 4 coupled to the middle of the fluid-path membrane 16 moves it between the open position shown in FIG. 2a, in which the fluid path 20 is open, and the closed position of FIG. 2b, in which the fluid path 20 is closed. A spring 3 provides the force for moving the ram 4.

To achieve the configuration shown in FIG. 2a, an electromagnet draws current. This results in a force that overcomes that of the spring 3 and thus draws the magnetorheological elastomer of the fluid-path membrane 16 to form a protrusion that closes the fluid path 20.

To achieve the configuration shown in FIG. 2b, the electromagnet stops drawing current. This allows the spring 3 to pull the fluid-path membrane 16 to eliminate the protrusion, thus opening the fluid path 20.

The configuration shown is one in which the fluid path 20 is open when no current is drawn. This is referred to as a "normally open" configuration. A configuration that is normally closed can be achieved in a similar manner. In such a configuration, the fluid path 20 is closed when there is no current.

Figure 3A:
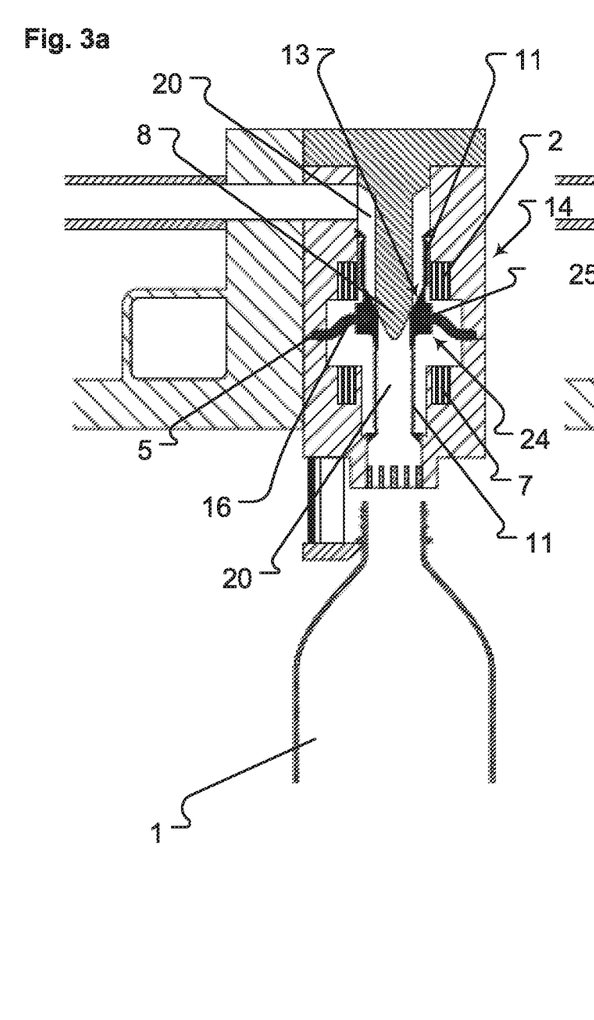
FIGS. 3a-b show another embodiment of an actuator.
Figure 3B:
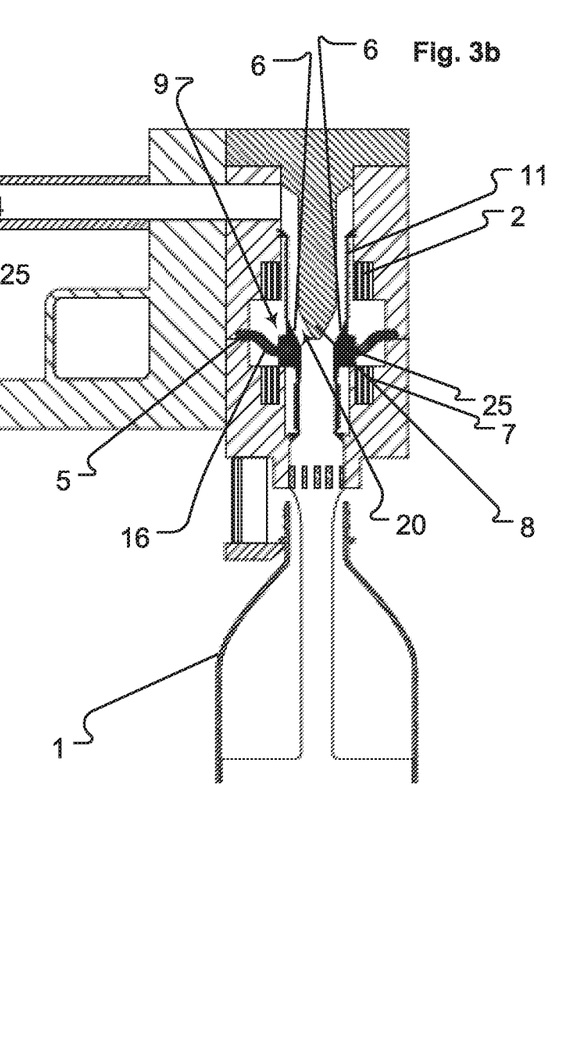

In an alternative embodiment, as shown in FIGS. 3a and 3b, the actuator element 24, which comprises the magnetorheological elastomer, is not configured as a fluid-path membrane 16. Instead, the actuator element 24 is a ring having a seat 5 along its outer edge. The seat 5 securely connects to the actuator 14.

A folding bellows 11 surrounds a punch 8 that is located in the middle of the fluid path 8. The folding bellows folds along a longitudinal direction defined by the punch 8. An inner edge 25 of the ring is secured to an outer surface of the bellows 11. This defines a movable part 9 that forms a closure part 6 that divides the bellows 11 into an upper and lower section.

First and second electromagnets 2, 7 lie above and below the actuator element 24. As will be seen below, these remove the need for a spring 3.

Instead of having the movable part 9 be between the upper and lower pieces of a two-piece bellows 11, it is possible to use a single-piece bellows with the movable part 9 being on its outer surface. In such embodiments, adhesive bonds the movable part 9 to the outer surface. The closure part 6 is then formed at the inner surface of the folding bellows 11 in the region in at which the movable part 9 connects to the bellows 11.

Current flowing through the first electromagnet 2 causes a field that draws the closure part 6 of the magnetorheological elastomer of the actuator element 24 upwards. As a result, a conical locking part 13 of the bellows 11 contacts the punch 8 and closes the fluid path 20.

Current flowing through the second electromagnet 7 creates a field that draws the closure part 6 of the actuator element 24 downward, as shown in FIG. 3b. This causes an annular gap between the locking part 13 and the punch 8, thus opening the fluid path 20.

Some embodiments have the movable part 9 comprise or consist of magnetorheological elastomer. As a result, it is possible to dispense with the ring-shaped actuator element 24 in FIGS. 3a and 3b. In such embodiments, the movable part 9 takes over the function of the actuator element 24.

Figure 4A:
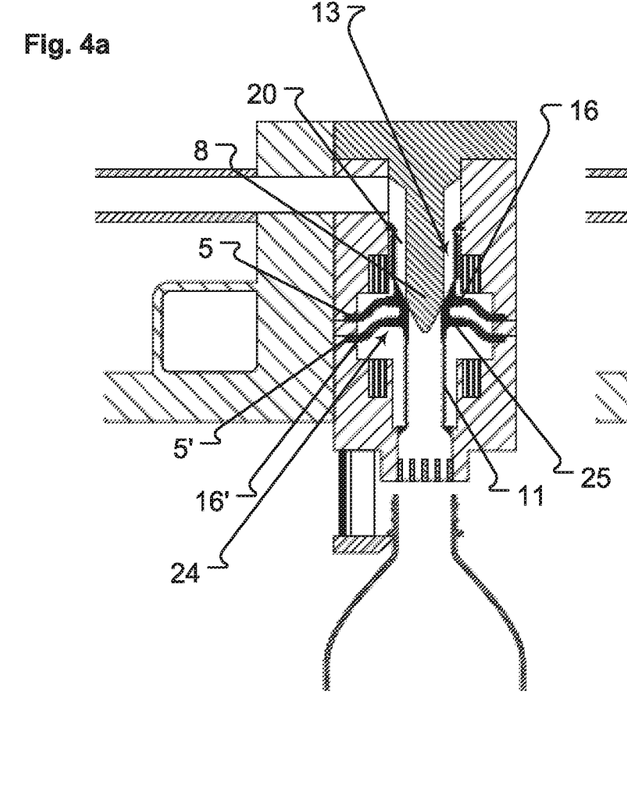
FIGS. 4a-b show another embodiment of an actuator.
Figure 4B:
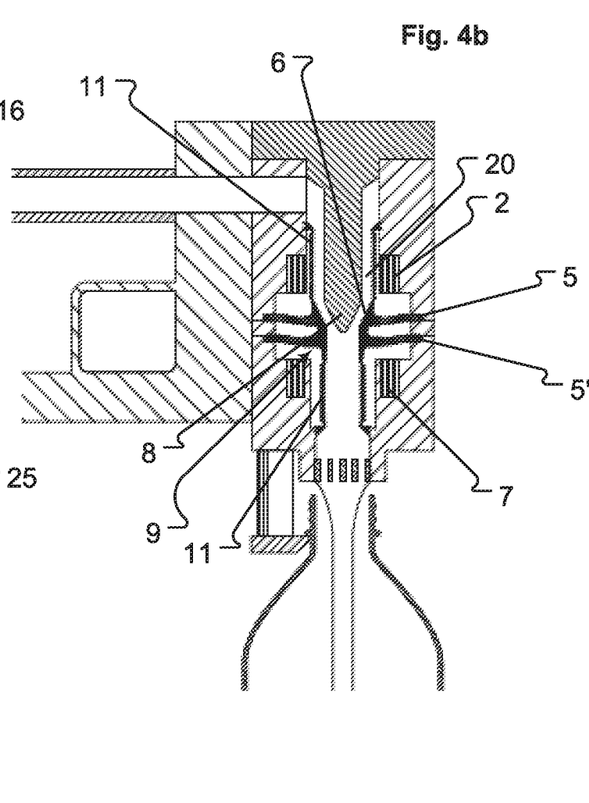

An alternative embodiment, shown in FIGS. 4a and 4b, features first and second actuator elements 24, 24' instead of only a single actuator element 24.

The movable part 9 connects the actuator elements 24, 24' to the folding bellows 11 where the closure part 6 is formed in the same way that it connects the single actuator element 24 from the preceding embodiment.

In this embodiment, the first and second electromagnets 2, 7 generate separately adjustable field strengths. This makes it possible to adjust intermediate positions of the folding bellows 11 relative to the punch 8. One of these intermediate positions is shown in FIG. 4b. As a result, it is possible to vary the size of the gap between the locking part 13 and the punch 8. This makes it possible to adjust the extent to which the path opens 20, thus permitting the actuator 14 to be used as an intake choke The foregoing embodiment can be implemented with a single-piece bellows or a two-piece bellows, as described in connection with FIGS. 3 and 3b. In addition, instead of making the actuator elements 24, 24' from magnetorheological elastomer, it is possible to instead make the movable part from magnetorheological elastomer.

Figure 5A:
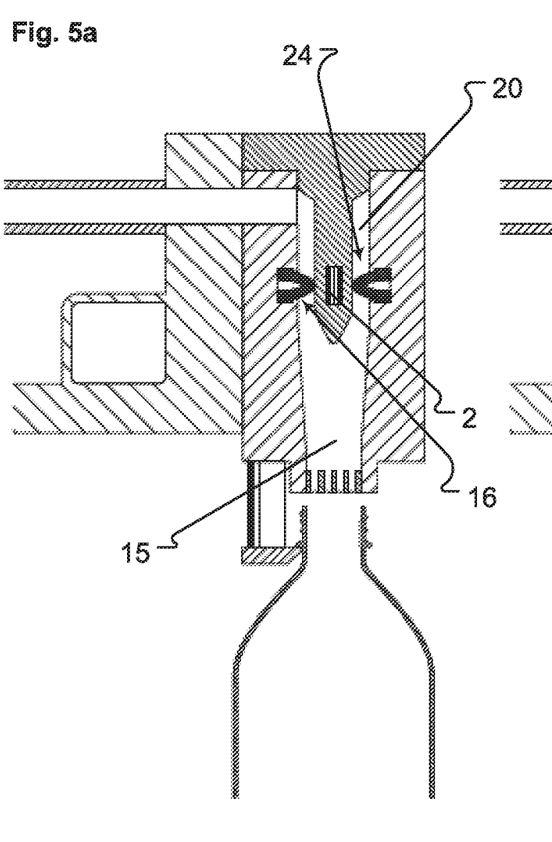
FIGS. 5a-b show another embodiment of an actuator.
Figure 5B:
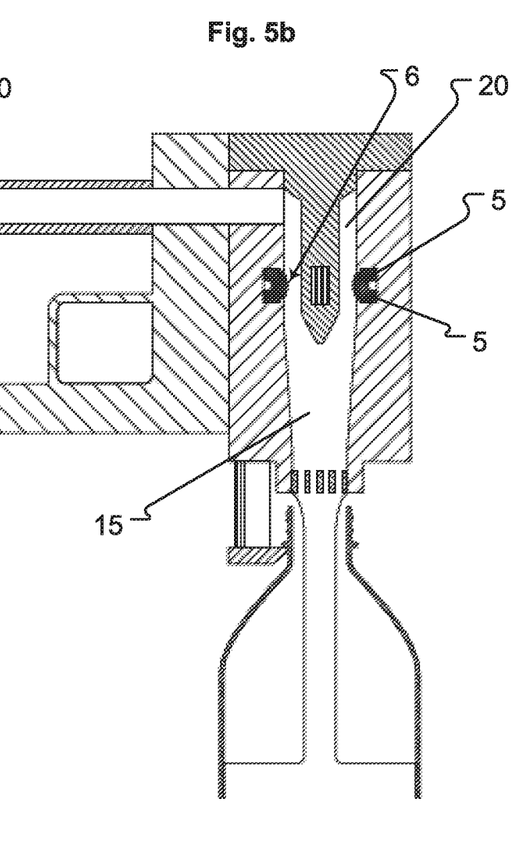

FIGS. 5a and 5b show yet another embodiment of an actuator 14. This embodiment features an electromagnet 2 within the punch 8 itself. A ring-shaped actuator element 24 is formed on the inner wall of the fluid path 20 surrounding the punch 8.

The actuator element 24 is securely connected to the actuator 14 at two points that are opposite each other. These points define the actuator element's seat parts 5. A U-shaped closure part 6 of the actuator element 24, which can be seen in cross-section, extends between these seat parts 5. The closure part 6 is a fluid-path membrane 16 that includes a magnetorheological elastomer.

In response to a current, the electromagnet 2 generates a field that causes the closure part 6 to moved towards the punch 8 until it assume a V-shape as shown in FIG. 5*a*. This closes the fluid path 20. Turning off the current to the electromagnet 2 allows the closure part 6 assume the U-shaped configuration shown FIG. 5*b*, thus opening the fluid path 20.

Figure 6A:
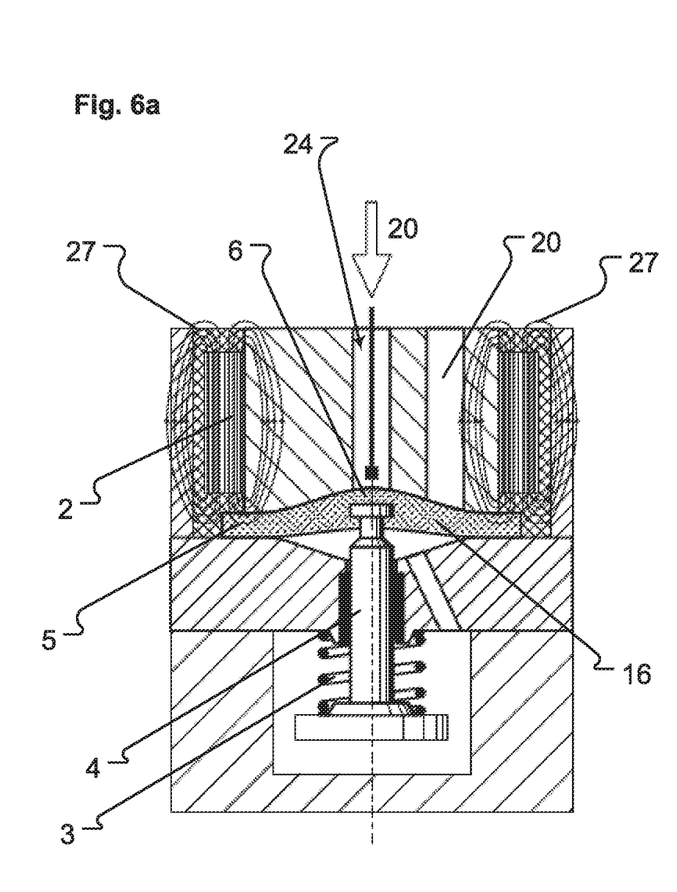
FIGS. 6a-b show another embodiment of an actuator.
Figure 6B:
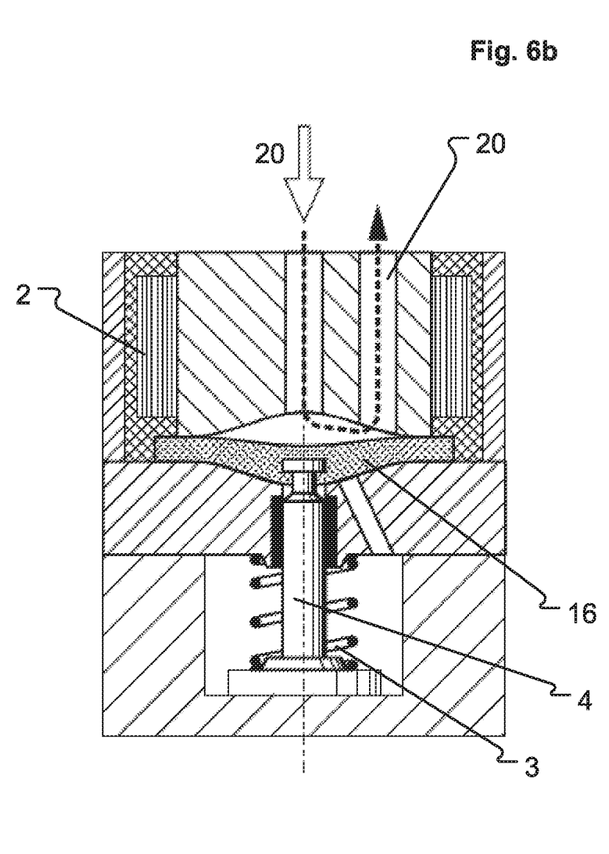

FIGS. 6*a* and 6*b* show another embodiment of an actuator 14 that relies on a spring 3 and an electromagnet 2 to open and close the fluid path 20. The spring 3 transmits its force a ram 4 that connects to a central portion of the fluid-path membrane 16.

As best seen in FIG. 6*b*, the fluid path 20 is U-shaped so that it approaches a region of interaction with the fluid-path membrane 16 and then executes a 180° turn after the region of interaction with the fluid-path membrane 16. In the closed state of the fluid path 20, shown in FIG. 6*a*, the fluid-path membrane 16 has an upward camber similar to that of a hat. This camber points upward, the direction of the closed fluid path 20.

Passing current through the electromagnet 2 generates a field 27 that draws the magnetorheological elastomer of the actuator element 24 upwards, so that it closes the fluid path 20 as shown in FIG. 6*a*.

Turning off this current allows the spring 3, which is coupled to the fluid-path membrane 16 via the ram 4, to draw the fluid-path membrane 16 downwards into the position represented in FIG. 6*b* thereby opening the fluid path 20. This configuration is a "normally open" configuration because the fluid path 20 is open when no current is flowing.

Figure 7A:
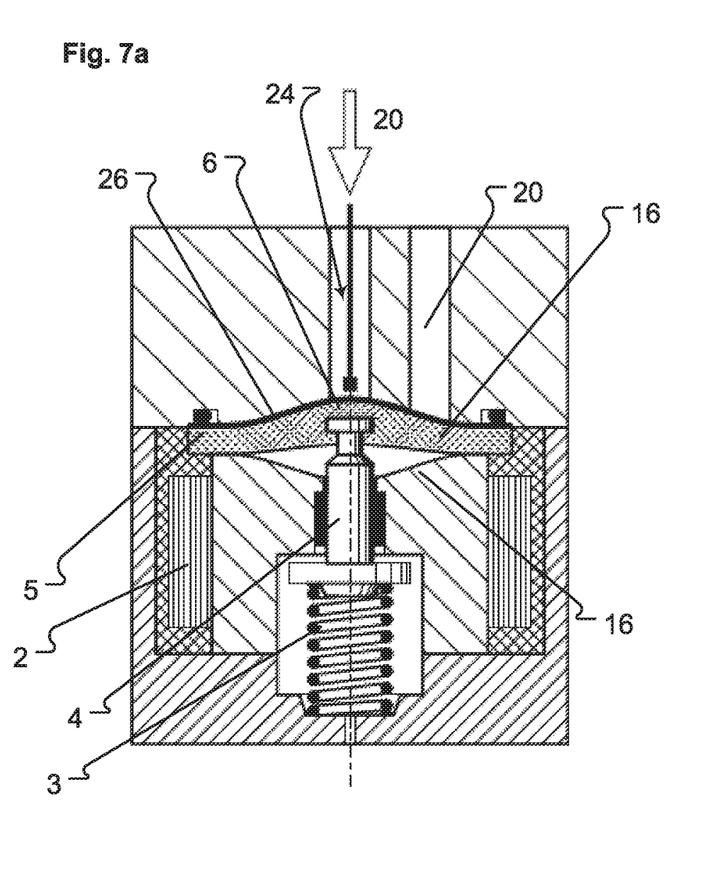
FIGS. 7a-b show another embodiment of an actuator.
Figure 7B:
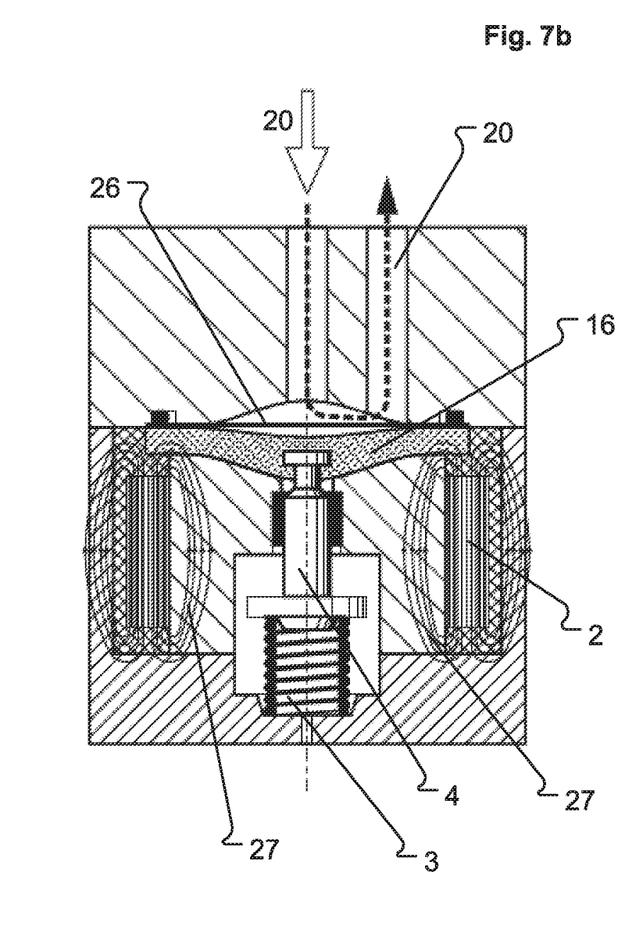

FIGS. 7*a* and 7*b* show a "normally closed" configuration in which an electromagnet 2 lies beneath the fluid-path membrane 16. In the configuration shown in FIG. 7*a*, the electromagnet draws no current. As a result, the spring 3 urges the fluid-path membrane 16 upward, thus closing the fluid path 20.

In the configuration shown in FIG. 7*b*, the electromagnet 2 draws current and thereby generates a magnetic field 27. This field draws the fluid-path membrane 16 downward against the force of the spring 3, thereby opening the fluid path 20. Switching off the current allows the spring 3 to press the ram 4 upwards, thus returning to the starting position shown in FIG. 7*a*.

In the embodiment shown in FIGS. 7*a* and 7*b*, the membrane 16 does not form the closure part 6. Instead, a fluid-tight additional membrane 26 made of a flexible plastic connects to an outer region of the fluid-path membrane 16.

When the electromagnet 2 draws current, the fluid-valve membrane 16, which comprises a magnetorheological elastomer, moves down in response to the magnetic field against the force of the spring 3. In doing so, it allows the additional membrane 26 to flatten out, thus opening the fluid path 20 as shown in FIG. 7*b*.

When the current is shut off, the spring 3 urges the fluid-valve membrane 16 upwards, which in turn pushes the additional membrane 26 upwards to close the fluid path 20, as shown in FIG. 7*b*.

Figure 8A:
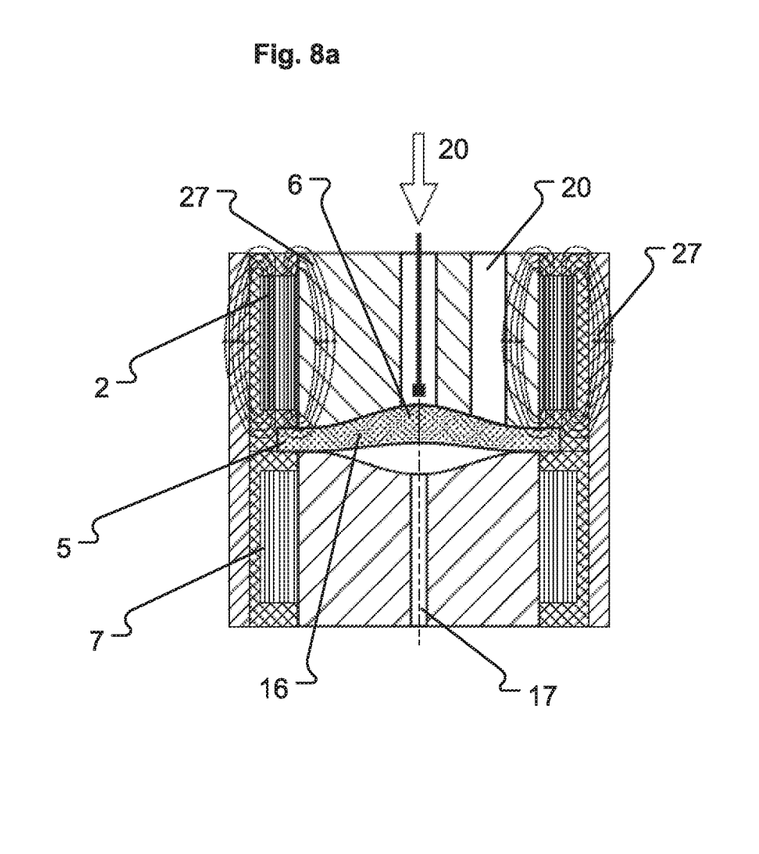
FIGS. 8a-b show another embodiment of an actuator.
Figure 8B:
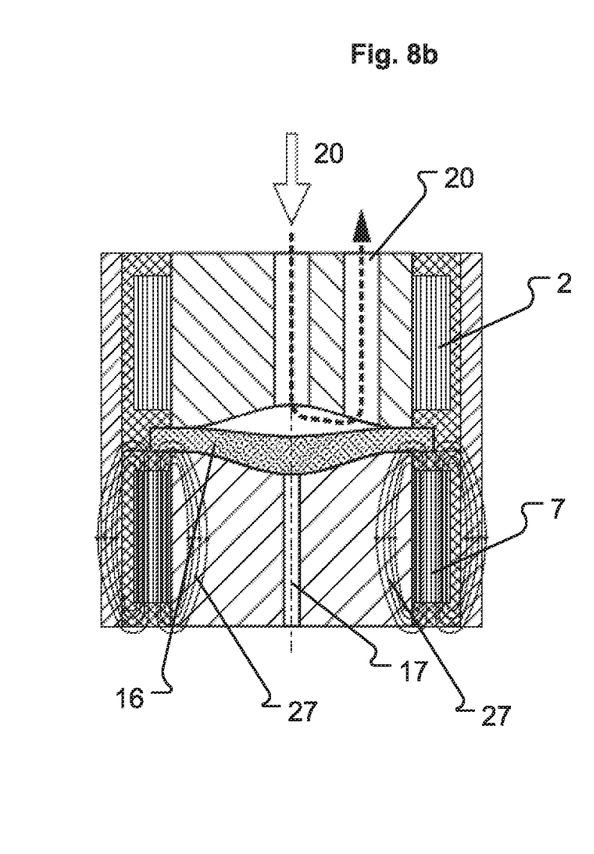

The embodiment shown in FIGS. 8*a* and 8*b* dispenses with the need for a spring. This embodiment features first and second electromagnets 7, 8 arranged above and below the fluid-valve membrane 16. In operation, only one of the electromagnets 7, 8 will draw current.

Passing current through the first electromagnet 7 creates a magnetic field 27 that draws the membrane 16 upwards and closes the fluid path 20 as shown in FIG. 8*a*. Conversely, passing current through the second electromagnet 8 creates a magnetic field 27 that draws the membrane 16 downward and opens the fluid path 20, as shown in FIG. 8*b*.

Figure 9A:
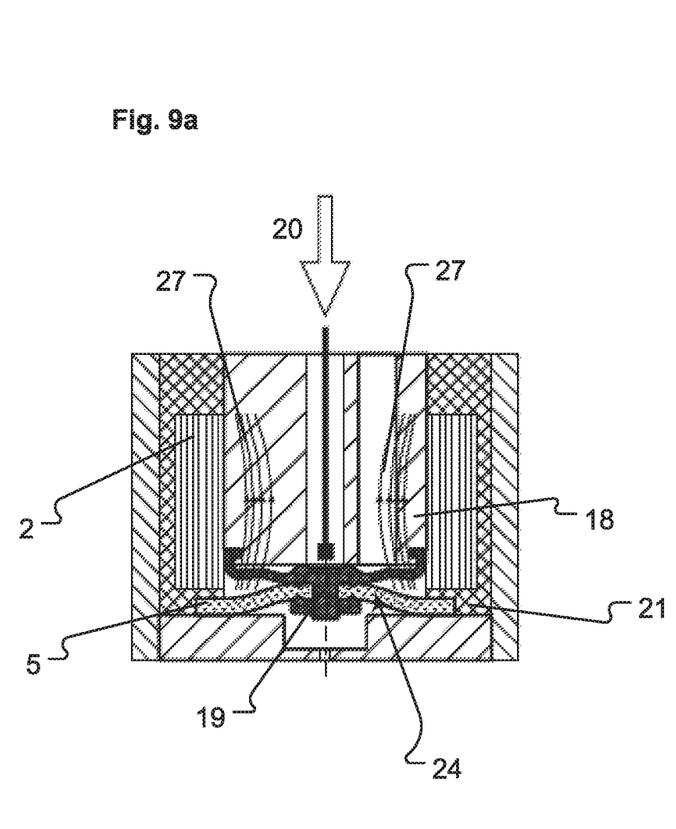
FIGS. 9a-b show another embodiment of an actuator.
Figure 9B:
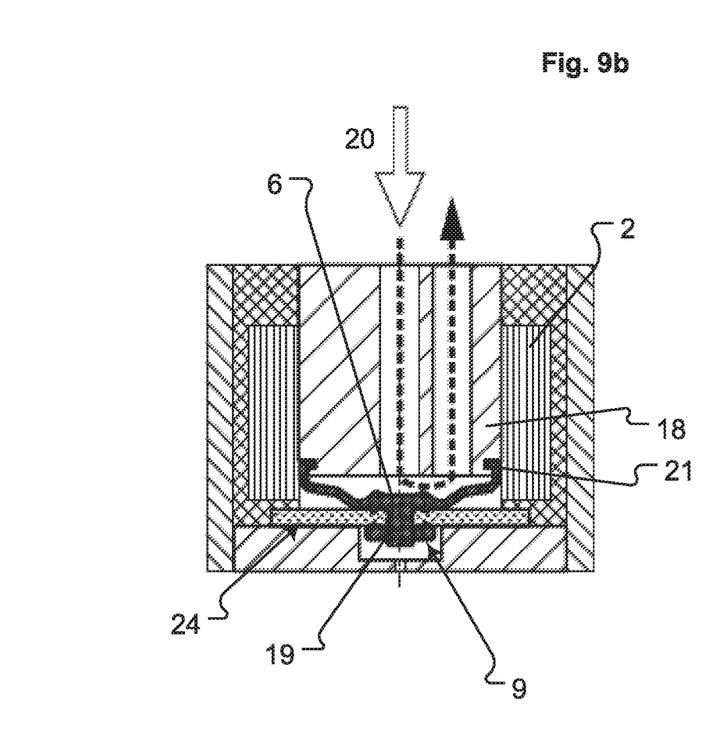

FIGS. 9*a* and 9*b* show another embodiment similar to that shown in FIGS. 6*a* and 6*b* but in a normally open configuration.

The embodiment shown in FIGS. 9*a* and 9*b* includes a plastic part 19. In some embodiments, the plastic part 19 is made of PTFE.

The plastic part 19 connects to a central portion of the membrane 16 and is anchored securely at an outer edge thereof to the housing 18. This plastic part 19 forms the movable part 9 that provides a readjusting force for opening the fluid path 20.

FIG. 9*a* shows magnetic field lines 27 indicating that the electromagnet 2 is drawing current. The closure part 6 of the actuator element 24, which does not comprise any fluid valve membrane 16, is moved upwards against the inherent tension of the plastic part 19. This closes the fluid path 20, as shown in FIG. 9*a*.

The upper middle part of the plastic middle part 19 closes the fluid path 20. The plastic middle part 19 therefore assume the role of the membrane 16 in the preceding embodiments, with the upper middle part being a closure part 6.

After the current of the electromagnet 2 is switched off, the readjusting force of the plastic part 19 causes the closure part 6 of the actuator element 24 to move downward. This opens the fluid path 20, as shown in FIG. 9*b*.

Figure 10A:
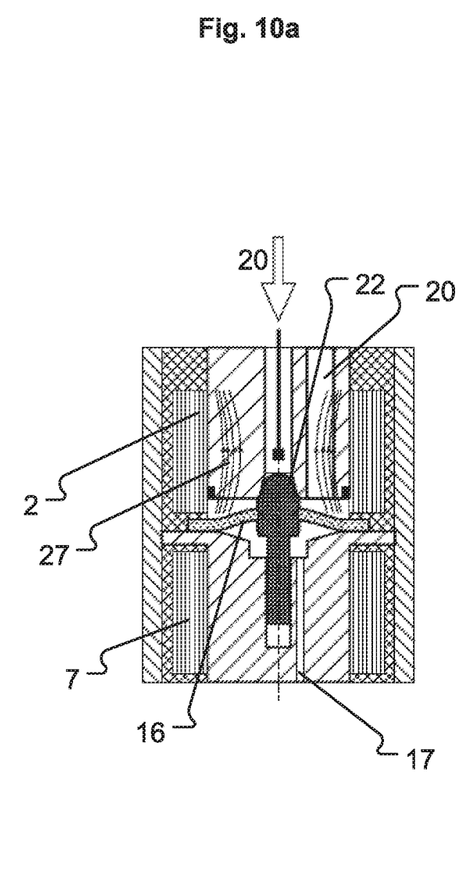
FIGS. 10a-c show another embodiment of an actuator.
Figure 10B:
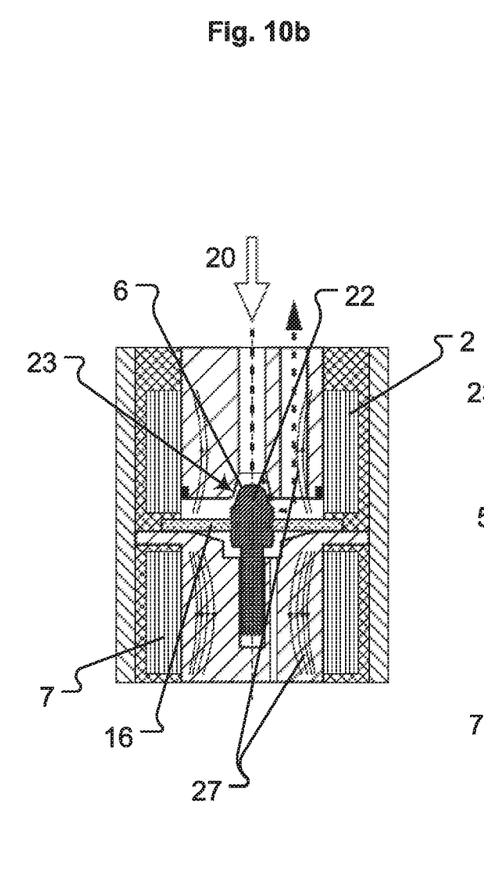
Figure 10C:
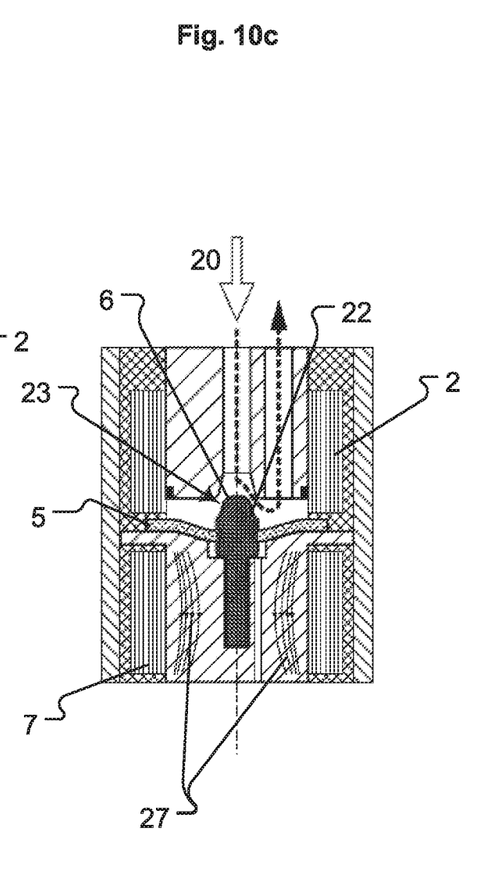

FIGS. 10*a*-10*c* show another embodiment in which first and second electromagnets 2, 7 move a closure part 6 of an actuator element 24 between a lower position, which is shown in FIG. 10*a*, and an upper position, which is shown in FIG. 10*c*. A head 22 connected to central portion of the closure part 6 defines a seat surface 23 at an upper end thereof. This seat surface 23 interacts with a conical surface of the wall that defines the fluid path 20.

In FIG. 10*a*, only the first electromagnet 2 draws current. This generates a field 27 that draws the closure part 6 upward so that the seat surface 23 seals the fluid path 20.

In FIG. 10*c*, only the second electromagnet 7 draws current. This generates a field 27 that draws the closure part 6 downward to open the fluid path 20.

In FIG. 10*b*, both first and second electromagnets 2, 7 draw current. By adjusting these currents, and hence the resulting fields 27, it is possible to hold the head 22 at any intermediate position between that shown in FIG. 10*a* and that shown in FIG. 10*c*. This provides a way to regulate flow through the fluid path 20.

Figure 11A:
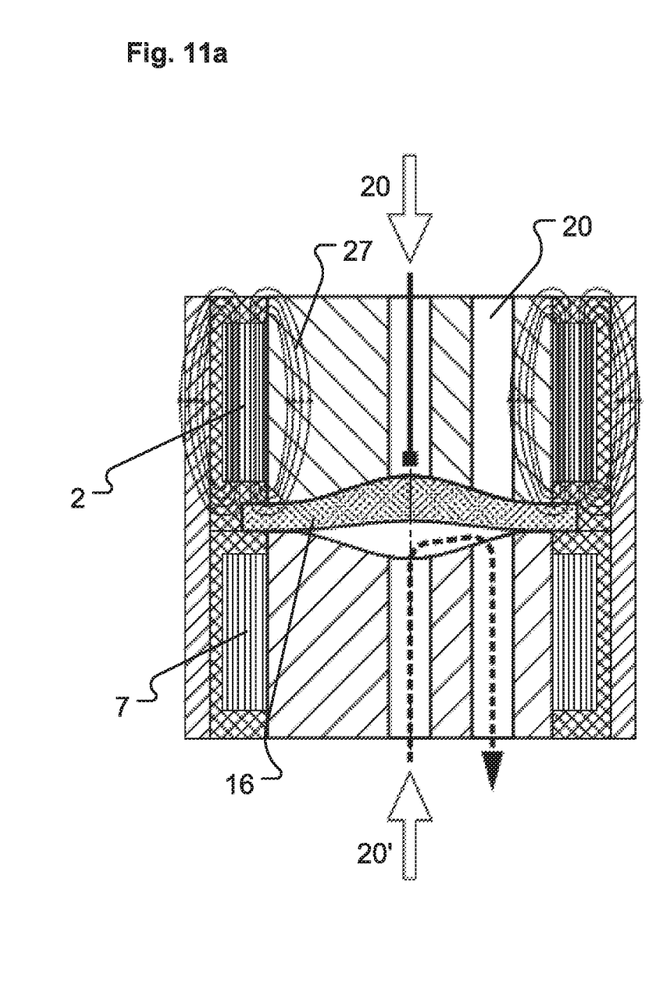
FIGS. 11a-b show another embodiment of an actuator.
Figure 11B:
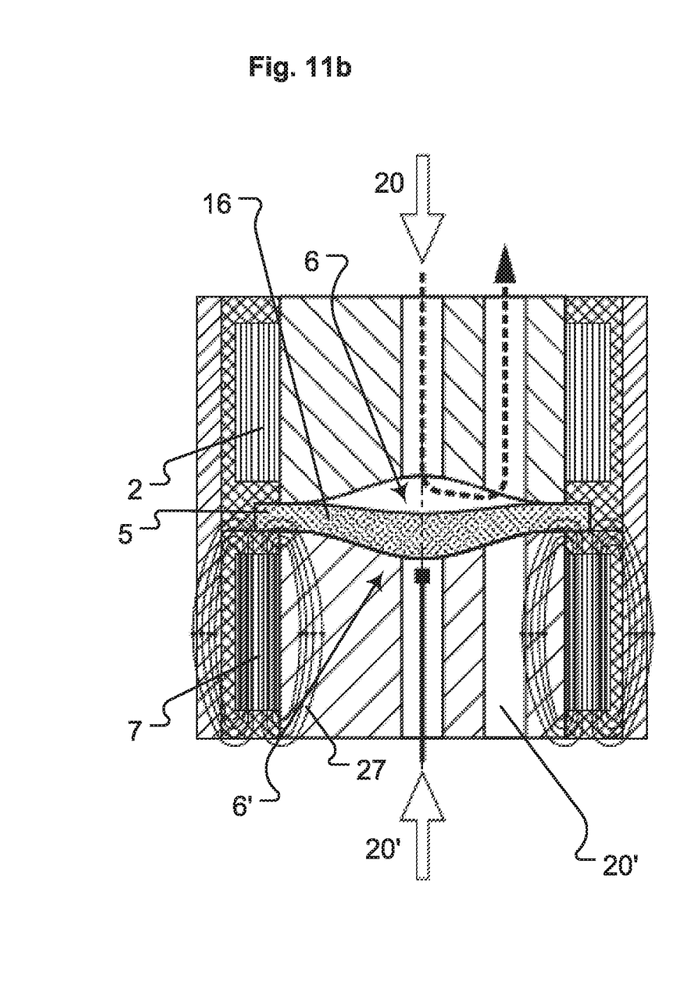

Another embodiment of the actuator 14, shown in FIGS. 11*a* and 11*b*, features a double valve for controlling first and second fluid paths 20, 20' using first and second electromagnets 2, 7. The first fluid path 20 is above the membrane 16. The second fluid path 20' is beneath the membrane 16. Energizing one magnet 2, 7 and not the other 7, 2 closes one fluid path 20, 20' and opens the other 20', 20. The membrane's movement has been described in connection with FIGS. 8*a* and 8*b*.

Figure 12A:
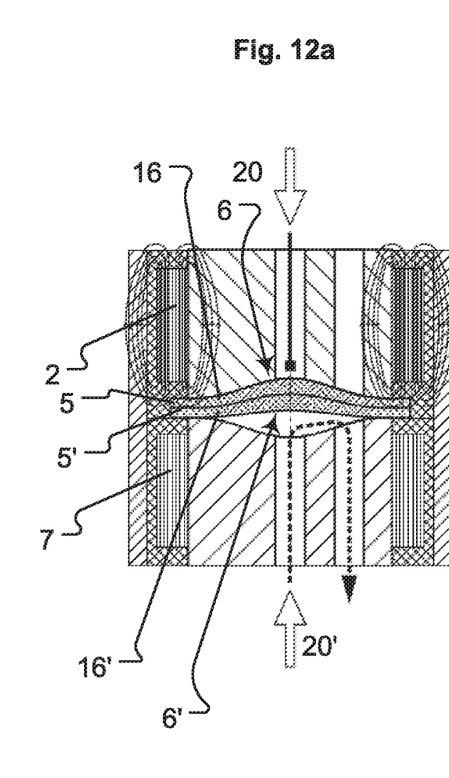
FIGS. 12a-c show another embodiment of an actuator.
Figure 12B:
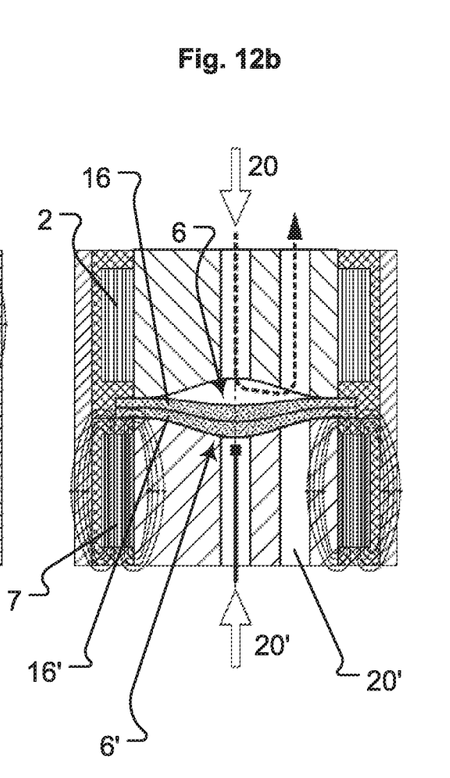
Figure 12C:
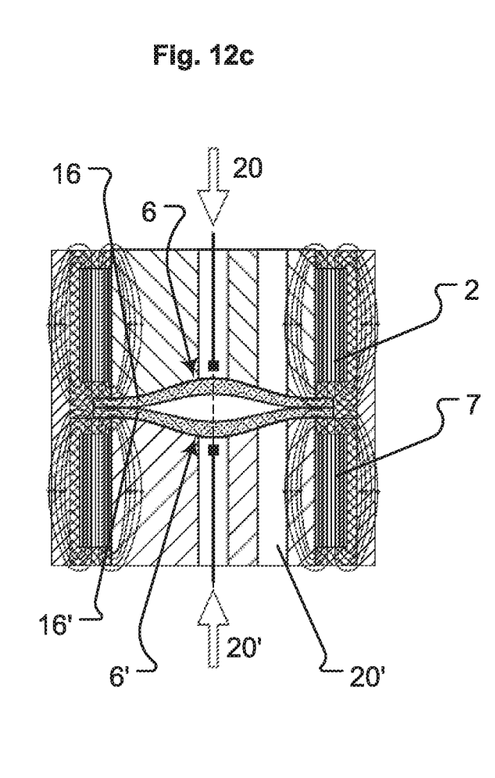

By having two membranes 16, 16' instead of one, it is possible to close both paths 20, 20', as shown in the embodiment of FIGS. 12*a*-12*c*. The first membrane 16 is directly above the second membrane 16' with their corresponding seat parts 5, 5' in contact. The first fluid valve membrane 16 opens or closes the first fluid path 20. The second fluid valve membrane 16' opens or closes the second fluid path 20'.

In operation, activating the first electromagnet 2 draws the first and second valve membranes 16, 16' upward, thus causing the upper surface of the first fluid valve membrane 16 to close the first fluid path 20. Since the second fluid valve membrane 16' has also been drawn upward, the second fluid path 20' opens at the same time, as shown in FIG. 12a.

In contrast, activating the second electromagnet 7 draws the first and second valve membranes 16, 16' downward, thus causing the lower surface of the second fluid valve membrane 16' to close the second fluid path 20'. Since the first fluid valve membrane 16' has also been drawn downward, the first fluid path 20 opens at the same time, as shown in FIG. 12b.

The presence of two membranes 16, 16' creates the possibility of a third state, shown in FIG. 12c, in which both electromagnets 2, 7 have been activated. This draws the first membrane 16 upward and the second membrane downward, thus closing both the first and second fluid paths 20, 20'. The opposed movement of the first and second membranes 16, 16' creates a cavity therebetween.

Having described the invention, and a preferred embodiment thereof, what is claimed as new and secured by Letters Patent is:

1. An apparatus comprising an actuator for controlling a fluid path, wherein said actuator comprises an electromagnet and an actuator element, wherein said electromagnet generates a changing magnetic field in response to control signals, wherein said actuator element provides an adjusting force, wherein said actuator element is disposed in said changing magnetic field, wherein said actuator element comprises a seat part, a closure part, and a fluid valve membrane that comprises a magnetorheological elastomer, wherein said magnetorheological elastomer responds to a change in said magnetic field by transitioning between first and second forms, wherein transitioning between said first and second forms causes said actuator element to transition between a rest position and an engagement position, wherein said closure part is movable relative to said seat part, and wherein said closure part is a constituent part of said fluid valve membrane, said apparatus further comprising a plastic part having a middle part that is located at said closure part, wherein an outer part of said plastic part is securely connected in said actuator, and wherein said plastic part forms said membrane.

2. The apparatus of claim 1, wherein said actuator element comprises a ring, wherein an outer edge of said ring forms said seat part and an inner edge of said ring securely connects to said closure part, and wherein said seat part is fixed.

3. The apparatus of claim 1, wherein said actuator element is a first actuator element, wherein said apparatus further comprises a second actuator element, said second actuator element being parallel to and having the same design as said first actuator element.

4. The apparatus of claim 1, wherein said first form defines a first switching position in which said membrane causes sealing of said fluid path and wherein said second form defines a second switching position in which said membrane causes said fluid path to be open.

5. The apparatus of claim 1, further comprising a beverage-filling system, wherein said actuator is one of a plurality of identical actuators of said beverage-filling system.

6. The apparatus of claim 1, wherein said actuator element comprises a disk, wherein an outer edge of said disk forms said seat part and an inner edge of said disk is securely connected to said closure part, and wherein said seat part is fixed.

7. An apparatus comprising an actuator for controlling a fluid path, wherein said actuator comprises an electromagnet and an actuator element, wherein said electromagnet generates a changing magnetic field in response to control signals, wherein said actuator element provides an adjusting force, wherein said actuator element is disposed in said changing magnetic field, wherein said actuator element comprises a seat part, a closure part, and a fluid valve membrane that comprises a magnetorheological elastomer, wherein said magnetorheological elastomer responds to a change in said magnetic field by transitioning between first and second forms, wherein transitioning between said first and second forms causes said actuator element to transition between a rest position and an engagement position, wherein said closure part is movable relative to said seat part, and wherein said closure part is a constituent part of said fluid valve membrane, said apparatus further comprising a double valve, wherein said actuator controls said double valve.

8. An apparatus comprising an actuator for controlling a fluid path, wherein said actuator comprises an electromagnet and an actuator element, wherein said electromagnet generates a changing magnetic field in response to control signals, wherein said actuator element provides an adjusting force, wherein said actuator element is disposed in said changing magnetic field, wherein said actuator element comprises a seat part, a closure part, and a fluid valve membrane that comprises a magnetorheological elastomer, wherein said magnetorheological elastomer responds to a change in said magnetic field by transitioning between first and second forms, wherein transitioning between said first and second forms causes said actuator element to transition between a rest position and an engagement position, wherein said closure part is movable relative to said seat part, wherein said closure part is a constituent part of said fluid valve membrane, wherein said electromagnet is a first electromagnet, wherein said actuator further comprise a second electromagnet, and wherein said first electromagnet is above said second electromagnet.

* * * * *